Figure 1:
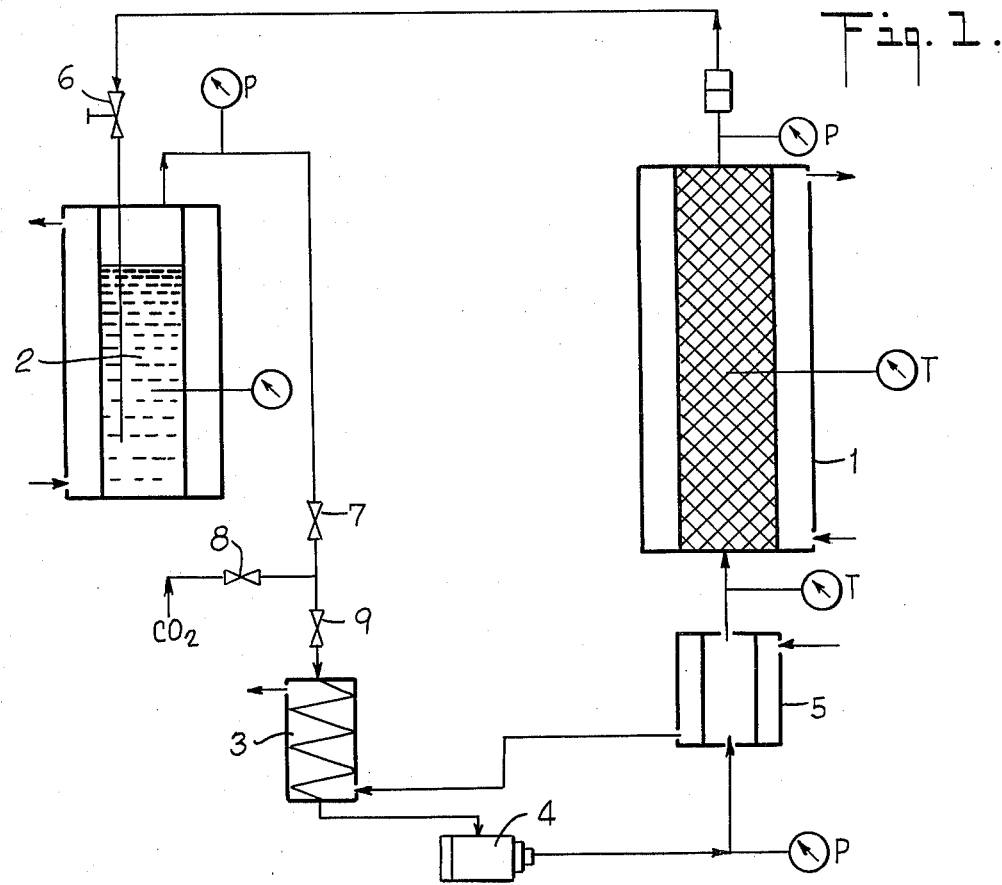

United States Patent [19]

Roselius et al.

[11] 4,328,255

[45] * May 4, 1982

[54] METHOD OF EXTRACTING COFFEE OIL CONTAINING AROMA CONSTITUENTS FROM ROASTED COFFEE

[75] Inventors: Wilhelm Roselius, Bremen St. Magnus; Otto Vitzthum, Bremen; Peter Hubert, Bremen-Lesum, all of Fed. Rep. of Germany

[73] Assignee: Studiengesellschaft Kohle m.b.H., Mulheim, Fed. Rep. of Germany

[*] Notice: The portion of the term of this patent subsequent to Oct. 22, 1991, has been disclaimed.

[21] Appl. No.: 804,830

[22] Filed: Jun. 8, 1977

Related U.S. Application Data

[63] Continuation of Ser. No. 222,625, Feb. 1, 1972, abandoned, and a continuation of Ser. No. 499,944, Aug. 23, 1974, abandoned, and a continuation of Ser. No. 641,214, Dec. 16, 1975, abandoned.

[30] Foreign Application Priority Data

Feb. 10, 1971 [DE] Fed. Rep. of Germany ....... 2106133

[51] Int. Cl.³ .............................................. A23F 5/48
[52] U.S. Cl. .................................. 426/417; 426/312; 426/386; 426/481; 426/425
[58] Field of Search ................ 426/312, 386, 425–434, 426/481, 417

[56] References Cited

U.S. PATENT DOCUMENTS

| | | | |
|---|---|---|---|
| 3,477,856 | 11/1969 | Schultz | 426/424 |
| 3,806,619 | 4/1974 | Zosel | 426/427 |
| 3,843,824 | 10/1974 | Roselius et al. | 426/386 |
| 3,939,281 | 2/1976 | Schwengers | 426/429 X |

FOREIGN PATENT DOCUMENTS

| | | | |
|---|---|---|---|
| 1057911 | 2/1967 | United Kingdom | 426/429 |
| 1106468 | 3/1968 | United Kingdom | 426/429 |

OTHER PUBLICATIONS

Chem. Abstracts 54:17744c, The Antioxygenic Properties of Coffee, 1958.
Coffee Processing Technology, Switz, vol. 2, 1963, Avi Publ. Co., Westport, Conn., pp. 22–23.

*Primary Examiner*—Joseph M. Golian
*Attorney, Agent, or Firm*—Sprung, Felfe, Horn, Lynch & Kramer

[57] ABSTRACT

A method of extracting coffee oil containing aromatic constituents in high yield and in stable form by extracting solid, roasted coffee with dry carbon dioxide under super-critical conditions of temperature and pressure.

3 Claims, 1 Drawing Figure

METHOD OF EXTRACTING COFFEE OIL CONTAINING AROMA CONSTITUENTS FROM ROASTED COFFEE

PRIOR APPLICATIONS

This application is a continuation of United States application No. 222,625, filed Feb. 1, 1972, now abandoned; United States application 499,944, filed Aug. 23, 1974, now abandoned; and United States application No. 641,214, filed Dec. 16, 1975, now abandoned.

FIELD OF INVENTION

This invention is concerned with a process for removing the aroma constituents from roasted coffee and their utilization to enhance the acceptability of coffee drinks produced from extracts.

BACKGROUND OF INVENTION

It is known to extract aroma fractions from roasted coffee and to utilize them as flavoring agents for coffee extract powders.

In one process roasted coffee is freed from volatile aroma constituents by means of water vapor or wet inert gases at low elevated pressures, whereby an aroma-containing condensate is obtained which is added to the thick coffee juices produced in the usual manner before or after the spray or freeze drying. This method has the disadvantage that the readily volatile aroma constituents which are sensitive to moisture come into contact with water and thus a number of undesirable reactions which can take place in the aqueous phase are initiated, for example condensations and hydrolysis reactions. In addition, a large proportion of the aroma is lost again, particularly in the case of spray drying.

In another method an aroma oil is extracted from roasted coffee by expression with the aid of worm presses or the like and is incorporated in the finished extracts, optionally in enriched form. Despite the fact that they contain an improved proportion of aroma constituents of medium and low volatility, these extracts nevertheless have the disadvantage of having a more or less intensive burning smell which is caused by the high pressures and temperatures occurring during pressing in the interior of the pressed mass and the consequent partial pyrolysis. In addition, because of the pressing conditions the content of readily volatile fractions is lower in these extracts than in fresh roasted coffee. Although the residues from the pressing process still have a high extract content, they cannot be directly processed in the usual extraction plants, since the proportion of fine material contained therein is very high and would lead to the clogging of the filters, for which reason the pressing residues would have to be converted into extractable coarse-grained material by further pressing.

In addition, aroma constituents have been obtained from roasted coffee by solvent extraction, the polarity of the solvent being so adjusted that as many aroma fractions as possible are extracted. The disadvantage of this process consists mainly in the difficulty of separating the solvents quantitatively from the aroma constituents; this is not possible without loss, particularly of the readily volatile components.

Finally, it is known for volatile aroma substances to be extracted from vegetable material, such as roasted coffee, with gaseous carbon dioxide at pressures of about 5 to 40 atmospheres, thereupon condensing the gaseous $CO_2$ and adding the condensate, together with the volatile aroma substances contained in it, to the coffee extract for the purpose of flavoring the latter. The volatile aroma substances can also be extracted with liquid $CO_2$, in which case some fatty constituents are also extracted in addition to the volatile aroma constituents obtained by extraction with gaseous $CO_2$. However, only negligibly small amounts of such fatty substances are produced by this means. As a practical matter, this process produces extracts which contain only the relatively volatile aroma producing substances as their major constituents.

THE INVENTION

It has now been discovered in accordance with this invention that the above difficulties can be substantially avoided by effecting the extraction with supercritical gases in which these substituents are soluble. Carbon dioxide is especially preferred although others, especially high volatile halogenated solvents, particularly halogenated hydrocarbon solvents containing up to about three carbon atoms with the major proportion of the hydrogen atoms replaced with halogen. Such extraction solvents have critical temperatures varying from about 30° C. to 100° C.

The invention recognizes that in principle it is correct to use $CO_2$, a substance which is neutral from the point of view of taste, as extraction medium, but that in order to achieve perfect extraction of the aromatic principle it is not sufficient to extract only the volatile fragrant substances which are not stable and must be added immediately to the coffee extract, but that the antioxidants contained in the roasted coffee and also the coffee oil must likewise be extracted to a considerable extent. The sensitive, volatile fragrant substances are in fact obtained by this means in adsorbed form with the oil as matrix, so that they can easily be metered. Additionally (because the oil extract also contains antioxidants) their stability is increased so that they can be stored and therefore simple to handle industrially.

This aim of also extracting the non-volatile oily flavoring substances as well as the antioxidants cannot, however, be achieved if liquid $CO_2$ or gaseous $CO_2$ at pressures of about 5 to 40 atmospheres is used as extraction medium. On the contrary-and this is another feature of the invention-$CO_2$ is used in the supercritical fluid phase. Supercritical $CO_2$ in the sense of the invention is $CO_2$ the temperature of which lies above the critical temperature of $CO_2$ (31.3° C.), while its pressure lies above the critical pressure of $CO_2$ (about 73 atmospheres). It is advantageous to maintain this minimum pressure in order more effectively to retain the extraction medium in a single phase. Although extraction is still possible in the multiphase range, the number of extraction cycles must then be increased.

Supercritical $CO_2$ has considerable dissolving power, which is substantially greater than that of $CO_2$ at normal pressure or at only slightly elevated pressure. The pressure of the supercritical $CO_2$ may be increased up to several thousand atmospheres, although it is rarely advantageous to increase the pressure above about 2000 atmospheres. Since the dissolving power of supercritical $CO_2$ increases with rising pressure and since the polarity of the solvent undergoes a modification by selection of the working pressure it is possible to adapt this dissolving power of the fluid phase to the desired aim; one has in fact a "solvent made to measure".

An object of the invention is a method for the extraction of coffee oil containing aroma constituents from roasted coffee, which is characterized in that the coffee is extracted with supercritical $CO_2$ in the fluid phase, in a closed circuit, at pressures of at least 80 atmospheres gauge and at temperatures above about 31.3° C.

By this method it is possible to extract up to 10% oil. In addition, because of the increased dissolving power at the high pressures utilized following the method of the invention, not only oils but also antioxidants are extracted in addition to the flavoring substances. A decisive factor in this connection is the fact that the flavoring substances are always obtained together with the antioxidants. As a result the products are storable from the outset and not subject to decomposition. The oil content of the extract can be adjusted as desired by varying temperature and pressure or partial pressure as desired by varying temperature and pressure or partial pressure of the $CO_2$. A certain proportion of oil should always be simultaneously extracted, because the oil is desirable as carrier for the adsorptive bond and in order to protect the volatile aroma components against oxidation.

It is therefore preferably with carbon dioxide to work at pressures between 200 and 400 atmospheres gauge and at temperatures above 35° C., in order to obtain an oil fraction of about 10 to 12% of the weight of the coffee.

Very high pressures above 350 atmospheres gauge provide in addition the further advantage that the polarity and hence the selectivity of $CO_2$ is thereby modified and it is thus made possible to control the quality of the aroma composition.

By varying the extraction temperature it is in addition possible to modify the character of the odor of the oils. Thus for example the aroma varies from "light, bland" at 50°–70° C. to "heavier, smoky" at 130°–150° C.

Dry $CO_2$ may be used either alone or mixed with other inert gases, in which case it will be necessary to work above the highest critical temperature occurring in the mixture.

The invention has been described principally with reference to $CO_2$, because this is the preferred extraction medium.

It is also possible for the other gases mentioned to be used alone as extraction media. Such gases may be sulphur hexafluoride $SF_6$ (critical temperature 45.6° C.), trifluoromethane $CHF_3$ (critical temperature 33° C.), monochlorodifluoromethane $CHF_2Cl$ (critical temperature 96° C.), monochlorotrifluoromethane $CF_3Cl$ (critical temperature 28.8° C.), perfluoropropane $C_3F_8$ (critical temperature 71.9° C.).

In the process according to the invention the extraction residues obtained are oils the color of which varies from yellow to dark yellow and which have a very intensive coffee aroma and, compared with oils from the mechanical pressing process, do not have a burnt smell. Aroma determination according to Wurziger (Deutsche LebensmittelRundschau 9, 189 (1952)) gave for example values of 9 to 10, whereas pressed oils have a value of only 2.5. The content of antioxidants is also higher than in the case of pressed oils.

Figure 2:
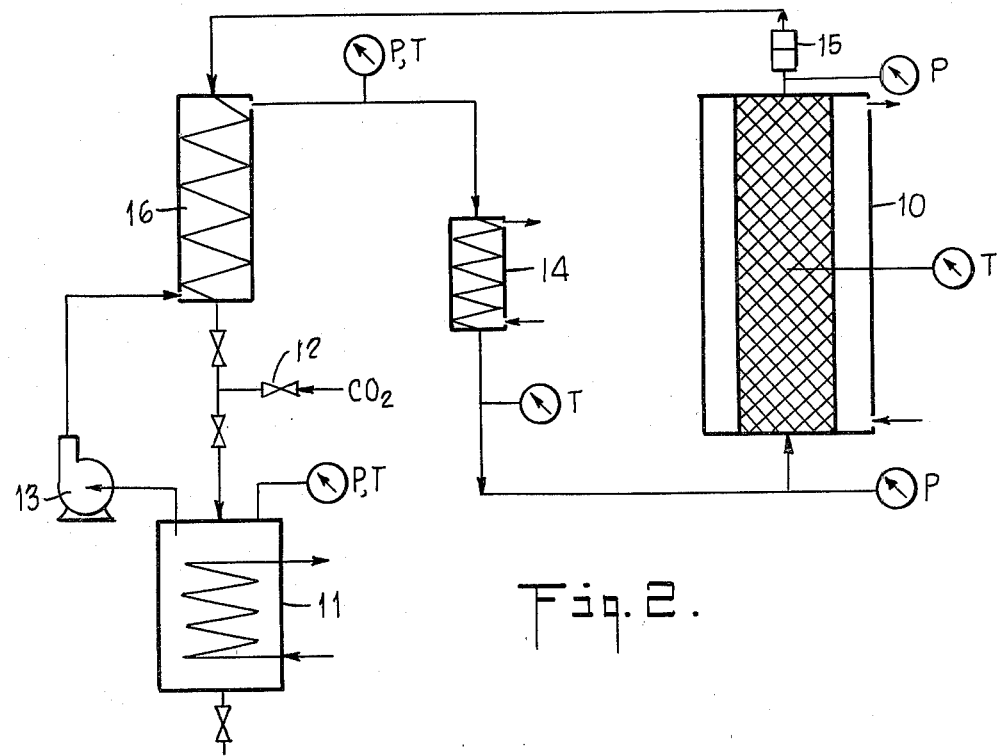

Two preferred forms of carrying out the method according to the invention are illustrated in FIGS. 1 and 2.

In the method illustrated in FIG. 1 a container 1 is charged with very coarsely ground roasted coffee, container 2 is half filled with liquid $CO_2$, and $CO_2$ is then drawn in by the compressor 4 through the valves 8 and 9 and the preheater 3, compressed, and forced through the heat exchanger 5 into the container 1. After the desired pressure has been attained in 1, valve 8 is closed, 7 opened, and throttle valve 6 is opened to such an extent that the pressure in 1 remains constant. The temperatures in 1 are above the critical temperature of $CO_2$ or other selected solvent. The volatile aroma constituents and the oil are now extracted in 1 and are both transferred to 2 with the current of gas. In container 2 the gas is condensed and the extracted constituents separated. The temperatures in 2 must lie below the critical temperature of $CO_2$. The $CO_2$ is then removed by suction from the vapor phase in 2, preheated in 3, compressed in 4, and passed on, etc. The duration of this cycle depends on the desired yield of oil, the temperature, and the pressure in container 1. On completion of the extraction the entire amount of solvent contained in the circuit is condensed in 2, and is very slowly evaporated off from the latter, so that the temperature does not fall substantially below $-10°$ C., since otherwise some oil fractions will freeze irreversibly.

In the method illustrated in FIG. 2 the container 10 is charged with very coarsely ground roasted coffee and the coolable collecting vessel 11 is completely filled with a liquid extraction medium such as $CO_2$ through valve 12. The liquid $CO_2$ is delivered by the pump 13, heated to supercritical temperatures in the afterevaporator 14, and forced into the extraction vessel 10. The gas leaves the latter through the filter 15 and in the heat exchanger 16 gives up part of its heat content to the still liquid extraction solvent flowing in the opposite direction, but must not itself fall below a temperature of about 35° C. if $CO_2$ is used. Transition to the subcritical, that is to say liquid condition is effected by additional cooling in the collecting reservoir 11. Here the aroma oil extracted in 10 is separated and collects on the bottom. The supernatant liquid $CO_2$ is drawn off again by the pump 13 and is partly evaporated in 16, complete evaporation being effected in 14 by additional heating. The pressure is substantially the same throughout the entire circuit apart from a slight increase in pressure produced by the pump in order to overcome resistance to flow. The operating time of the circuit depends once again on the desired yield of oil and on the pressures and temperatures selected in 10.

From literature it is known that the ability of gaseous $CO_2$ to absorb oils increases with rising pressure and attains its maximum in the case of liquid $CO_2$; it is also known that supercritical $CO_2$ has increasing solvent power with rising pressure, and that this is so only up to a maximum value which corresponds to that of liquid $CO_2$.

It is therefore extremely surprising that in the method of the invention the ability of the supercritical $CO_2$ phase to absorb aroma constituents, coffee oils, and antioxidants is considerably greater than the solvent power of liquid $CO_2$, so that through the liquefaction of the supercritical phase it is possible for the constituents absorbed by it to be separated.

In the comparative tests described below the extraction of roasted coffee was effected with supercritical $CO_2$ (tests b–f) in the apparatus according to FIG. 1 and in accordance with the mode of operation of Example 1. Extraction with liquid $CO_2$ (test a) was effected in the same apparatus, the heat exchangers simply being disconnected. In all cases an aroma oil with the aroma concentration typical of roasted coffee was obtained. The yields achieved were in each case calculated per 1 kg of aroma oil.

| | Amount of $CO_2$ in kg required for extracting 1 kg of aroma oil | Temperature (°C.) | Pressure (atmospheres gauge) |
|---|---|---|---|
| a | 29400 | 29 | 90 |
| b | 390 | 33 | 310 |
| c | 373 | 70 | 310 |
| d | 472 | 100 | 310 |
| e | 690 | 130 | 310 |
| f | 422 | 160 | 310 |

The roasted coffee freed of oil can be used for producing extract without further pretreatment. The fine-grained fraction, which here should as a maximum amount to 4%, amounts to 3% in the case of the pressure-extracted material, that is to say considerably lower. The content of watersoluble extract fractions is not reduced by $CO_2$ treatment.

The flavoring of coffee extracts by means of the oils obtained according to the invention can be carried out by the following methods:

(a) After evaporation of the $CO_2$ from containers 2 and 11 (see FIGS. 1 and 2 respectively) the relatively thin-bodied oil is run off and incorporated in known manner by mixing etc. in coffee extract powder.

(b) Before commencement of the extraction, sprayed coffee is placed in containers 2 or 11 and completely binds the oils and aroma substances by adsorption. On completion of the extraction the $CO_2$ is removed by evaporation and a powder is obtained which still flows freely and the proportion of oil in which may amount to up to 40% without substantially impairing processability. As an aroma carrier it may be incorporated in the extract powders in the usual manner.

The residual $CO_2$ remaining in the material has a very advantageous action as an inert protective gas.

EXAMPLE 1

400 g. of coarsely ground roasted coffee (containing caffeine) are treated for three hours at 70° C. and at 290 atmospheres gauge with $CO_2$ in the installation shown in FIG. 1.
Result: oil: 41 g of clear light yellow oil, aroma index 9.6.
Aroma: mild, bland.
Coffee: extract content (water soluble): 28.5%
Soluble in petroleum ether: 4.9% (before treatment 14.6%)
Fine grain fraction <0.5 mm: 3%.

The antioxidant activity of the aroma oil obtained in this manner was measured by SULLY's peroxide number method (see Handbuch der Lebensmittelchemie, vol. IV, P. 877, SpringerVerlag). For this purpose pure fat free from antioxidants was mixed with 0.1% of aroma oil and compared with untreated fat as blank test sample:

| Sample | Start | After 1 hour 100° C. | After 2 hours | After 3 hours | After 4 hours |
|---|---|---|---|---|---|
| Pure fat | 1.3 | 2.8 | 6.9 | 13.8 | 22.6 |
| Fat + 0.1% | 1.4 | 2.2 | 3.7 | 6.7 | 15.1 |

| Sample | Start | After 1 hour 100° C. | After 2 hours | After 3 hours | After 4 hours |
|---|---|---|---|---|---|
| aroma oil | | | | | |

EXAMPLE 2

400 g of coarsely ground roasted coffee (containing caffeine) are treated for four hours at 150° C. and at 300 atmospheres gauge with $CO_2$ in the installation according to FIG. 1.
Result: oil: 52 g of clear dark yellow oil, aroma number 8.7.
Aroma: smoky, heavier than in Example 1.
Coffee: extract content (water soluble): 28.7%
Petroleum ether soluble: 1.6%
Fine grain fraction <0.5 mm: 3.2%.

EXAMPLE 3

400 g. of coarsely ground roasted coffee (decaffeinated) are treated with $CO_2$ for four hours at 90° C. and at 320 atmospheres gauge in the installation according to FIG. 2.
Result: oil: 40 g of yellow, slightly turbid oil, aroma number 8.5.
Aroma: slightly smoky, medium heavy.
Coffee: extract content (water soluble): 25.1%
Petroleum ether soluble: 3.2% (before treatment 13%)
Fine grain fraction <0.5 mm: 2.9%.

EXAMPLE 4

40 g of coarsely ground roasted coffee (containing caffeine) are treated for one hour at 50° C. and at 1740 atmospheres gauge with $CO_2$ in the installation according to FIG. 1.
Result: oil: 4.5 g of light yellow, slightly turbid oil, aroma number 10.5.
Aroma: mild, medium heavy.
Coffee: extract content (water soluble): 26%.
Petroleum ether soluble: <0.5%
Fine grain fraction <0.5 mm: 3.5%.

EXAMPLE 5

400 g of coarsely ground roasted coffee (containing caffeine) are treated with $CO_2$ for three hours at 80° C. and at 300 atmospheres gauge in the installation according to FIG. 1. 100 g. of sprayed coffee had previously been introduced into container 2 or 11. After evaporation of the $CO_2$, 143 g of highly aromatic powder, still capable of flowing, were obtained, with which it was possible for 22 kg of frozen extract to be flavored in the conventional manner. This material is substantially superior in respect of aroma, even after being stored for months, to a product flavored with pressed oil.

EXAMPLE 6

230 g of coarsely ground roasted coffee (containing caffeine) are treated for four hours at 80° C. and at 290 atmospheres gauge with $CHF_3$ (trifluoromethane) in the installation shown in FIG. 1.
Result: oil: 20 g of light brown clear oil aroma index 11.0
Aroma: slightly smoky
Coffee: extract content (water soluble)=26%
Soluble in petroleum ether=4% (before treatment 12.5%)

Fine grain fraction <0.5 mm=2.5%

EXAMPLE 7

250 g of coarsely ground roasted coffee (containing caffeine) are treated for five hours at 80° C. and at 300 atmospheres gauge with a gas mixture consisting of 50% by weight $CO_2$ and 50% by weight $SF_6$ (sulfur hexafluoride) in the installation shown in FIG. 1.
Result: oil: 26 g of light brown clear oil aroma index 14
Aroma: slightly smoky, medium heavy
Coffee: extract content (water soluble)=26.3%
Soluble in petroleum ether=2% (before treatment 12.5%)
Fine grain fraction <0.5 mm=2.8%.

What is claimed is:

1. In the method of extracting coffee oil, containing aromatic constituents, using carbon dioxide, the improvement for selectively extracting the oil in high yield and in stable form, which comprises extracting solid, roasted coffee with dry carbon dioxide under supercritical conditions of pressure of at least 80 atmospheres gauge and supercritical conditions of temperature of above 31.3° C.

2. Improvement according to claim 1, in which the extraction is effected in a temperature range of from 40° to 170° C.

3. Improvement according to claim 1, in which an oil fraction of about 10 to 12 weight percent of the coffee is extracted.

* * * * *